United States Patent [19]
Griffiths et al.

[11] 3,734,629
[45] May 22, 1973

[54] INSTRUMENT FOR DETERMINING THE OPTICAL DENSITY OF FLUIDS

[76] Inventors: Victor Sidney Griffiths, 21 Symonds Lane, Guildford; Roynon Howes, 1 Strathaven Close, Linton, both of England

[22] Filed: June 22, 1971

[21] Appl. No.: 155,507

[30] Foreign Application Priority Data
June 26, 1970 Great Britain.....................31,006/70

[52] U.S. Cl. ....................356/201, 250/218, 356/208
[51] Int. Cl. ........................G01n 21/22, G01n 21/26
[58] Field of Search..............................250/218, 227; 356/201, 208, 241; 356/96 R, 96 B

[56] References Cited
UNITED STATES PATENTS

| | | | |
|---|---|---|---|
| 3,383,979 | 5/1968 | Gibson | 250/227 X |
| 3,586,862 | 6/1971 | Topol | 356/208 X |
| 2,203,720 | 6/1940 | Dale | 356/201 |
| 2,324,304 | 7/1943 | Katzman | 356/208 |
| 2,682,800 | 7/1954 | Ennis et al. | 356/201 X |
| 3,263,553 | 8/1966 | Baruch | 250/218 |
| 3,551,670 | 12/1970 | Topol | 356/208 X |

*Primary Examiner*—William L. Sikes
*Assistant Examiner*—F. L. Evans
*Attorney*—Haidt & Haffner Brooks

[57] ABSTRACT

A rod or tube made of an inert material into a part of which the fluid to be tested can enter and in which are embedded a light source and a photo-electric cell arranged so that light from the source passes through the fluid and actuates the cell.

7 Claims, 3 Drawing Figures

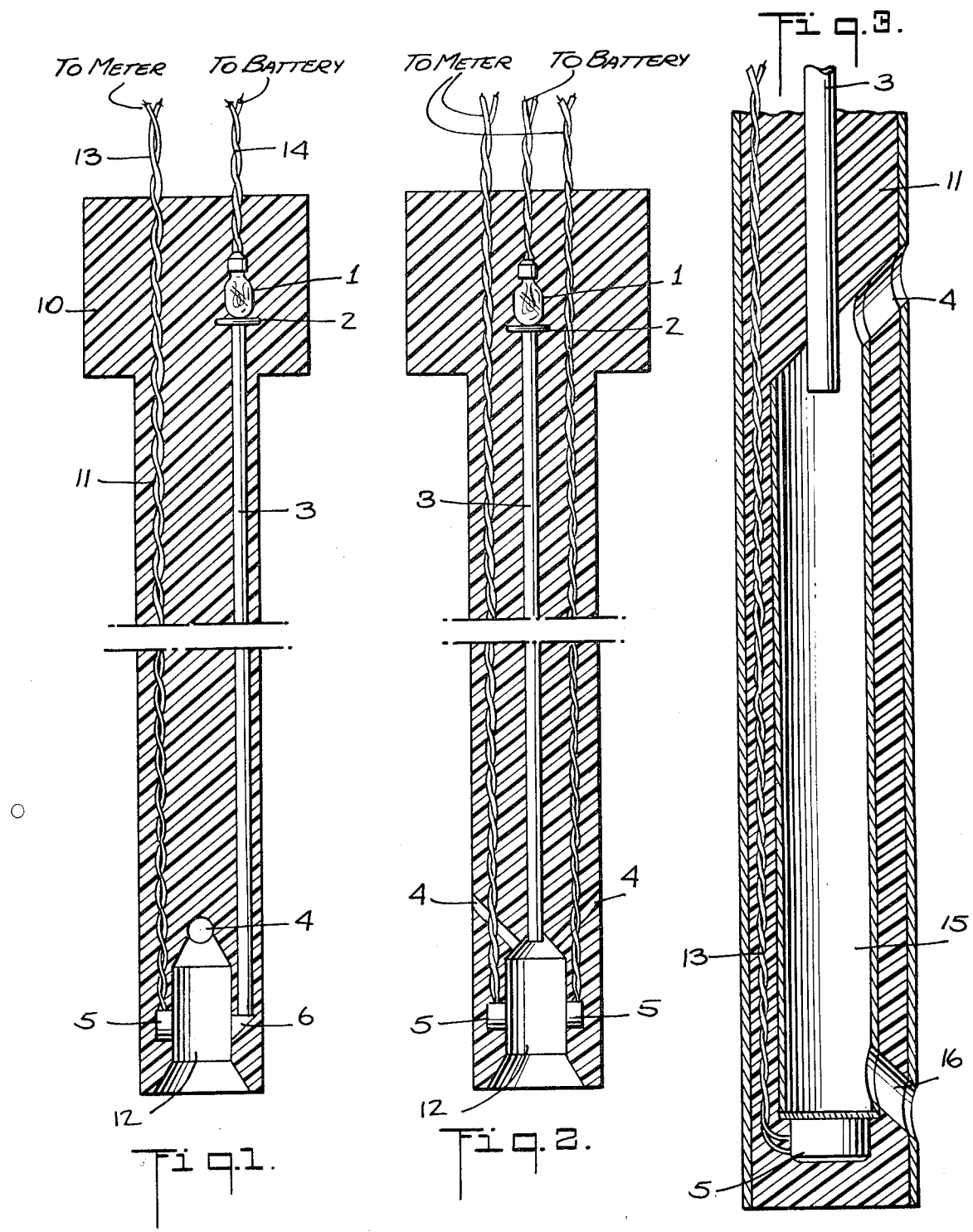

INSTRUMENT FOR DETERMINING THE OPTICAL DENSITY OF FLUIDS

In conventional colorimeters and spectrophorometers the liquid to be measured is poured or pumped into a transparent cell which is then placed between a light source and a light measuring device. The apparatus is bulky and inconvenient to use. The cells must be kept very clean and the work carried out by skilled operators.

It is an object of this invention to provide a device which makes the testing operation much simpler so that only semi-skilled workers are required to carry it out.

According to the invention an instrument for determining the optical density of a fluid comprises a rod or tube of a material which is inert to the fluids it is likely to be used with, which rod or tube has a cavity in it which extends a short distance along the rod or tube and, embedded in the said rod or tube, a light source, for instance, a battery-operated bulb and a photo-electric cell in the necessary electric leads for these items which are so disposed that when the slotted end of the instrument is immersed in a fluid, light passes through the fluid and actuates the cell.

The latter is connected in the usual manner to a meter which has been calibrated so that the readings obtained indicate the optical density of the fluid.

The rod or tube, hereinafter referred to as the 'probe,' is made for instance of an inert plastics material such as an epoxy resin or polymethylmethacrylate. Such materials are light in weight, non-conductive and easy to machine. It is suitably cylindrical but can have any other cross-section than circular. It is long enough for it to be inserted into the liquid or gas to be tested while being held in the hand. Its other dimensions are such that the other requirements of the invention can be met. A suitable size for general use is about 150 mm in length and of circular cross-section with diameter of 12 mm.

The probe has a cavity in it, for instance a slot or channel, preferably at one end, into which fluid can flow when the probe is immersed in it. The cavity need only be sufficiently long to provide a path through which light from a light source can pass to a cell. The cavity should be provided with a vent so that the fluid can fill it sufficiently.

The light source is conveniently a battery-operated lamp while the photo-electric cell is any device which when light falls on it causes a current to change or generates a current. There are several cells of this type available, for instance, photo-conductive or photo-diode cells, photo-voltaic, photo-emissive, photo-transistor, thermopile, thermistor and photo-pneumatic or Golay cells.

The light source and cell are placed in positions in the probe that when the light is on it will pass through the fluid in the cavity in the probe and fall on the cell. For instance, the light source and the cell may be one on each side of the cavity with the necessary electric leads passing along the probe from the battery and to the meter. Alternatively, either or both the light source and the cell may be in the handle part of the probe, channels and prisms or reflecting surfaces being provided as necessary to direct the light through the probe and through the liquid in it. If desired the light may be passed from the source through a light filter or through a monochromator.

The probe is conveniently moulded by pouring the liquid resin into a mould in which the various items have been previously located. On solidifying of the resin they remain embedded in it and so are preserved from damage by breakage or corrosion.

The whole device can be made so small that it can be carried around without difficulty in the pocket or a small case. It can therefore be used to test liquids or gases in situ by simply dipping the slotted end of the probe into the fluid and reading off the meter. Only a small volume of fluid is needed and it does not have to be removed from the vessel containing it.

If desired in some cases a small amount of a wetting agent added to a liquid may avoid the formation of bubbles on the surface of the slot or channel which would otherwise interfere with the determination being made.

The drawings show : in

FIG. 1 a probe with the light source in the handle part and the cell near the liquid-containing cavity;

FIG. 2 the locations are similar but there is a different arrangement of the various items;

FIG. 3 one end of a probe showing a channel into which the fluid to be tested flows.

In the drawing in FIG. 1 the light source is a lamp 1 embedded in the handle 10 of a probe which is a cylindrical block 11 of polymethylmethacrylate. The light passes along the tube 3 in the cylinder after passing through a filter 2. Thence the light is reflected from a silver-backed prism 6 through the liquid in the slot 12 on to the photo-electric cell 5. Leads 13 and 14 connect the cell 5 and the lamp 1 respectively to a meter and battery. The meter is of conventional form but is kept as small as possible. This is also a desirable feature of the probe instrument itself and that shown in FIG. 1 is only about 150 mm in length. Although the meter is shown separately in the drawings it could be contained in the handle of the device if preferred.

FIG. 2 shows the device in a form suitable for measuring the turbidity of a liquid. In this case the light is passed down the center of the rod or tube into the liquid whence it is scattered to one or more photo-electric cells in the walls of the slot. In both cases an air vent 4 is provided leading from the inside end of the channel so as to prevent liquid from entering it.

FIG. 3 — the same reference numerals are used for like parts. Instead of the slot 12 in FIGS. 1 and 2 however a channel 15 is shown into which fluid passes through the part 16.

The device is small enough to be easily portable by the operator so that it may be carried for instance round a factory site and readings taken in any number of vessels as easily as making a reading of temperature.

Alternatively the device can be secured in a fixed position and continuous or intermittent readings taken and transmitted to a recorder. One particular use of this kind which is envisaged is for measuring the optical density or turbidity of the exhaust gases from industrial engines, automobile engines and the like. In such cases the device would require to be shielded from the effects of the heat generated.

We claim :

1. An instrument for determining the optical density of a fluid comprising an elongated rod having a first free end, and a second end opposite said free end, said rod having an integral, coaxial tubular portion extending therethrough from adjacent said free end toward said opposite end but terminating at a point spaced from said opposite end, said tubular portion having a wall encircling a cavity for receiving said fluid therein and having an opening at the end thereof adjacent said free end for admitting said fluid into said cavity, a lamp embedded in said rod adjacent said opposite end thereof, light transmitting means extending from said lamp to said cavity for transmitting light from said lamp to said cavity and in a rectilinear path across a portion of said cavity and at least one light responsive cell embedded in said tubular portion adjacent said cavity and in said path for receiving light transmitted across said portion of said cavity and hence, through fluid contained therein and producing as electrical signal indicative of the density of said fluid.

2. An instrument as set forth in claim 1, wherein said opening extends from said free end to said cavity, whereby said cavity is open in a direction longitudinally of said rod.

3. An instrument as set forth in claim 2, wherein said rod further comprises at least one air vent extending from a surface thereof spaced from said free end to a portion of said cavity spaced from said free end of said rod.

4. An instrument as set forth in claim 3, wherein said cell has a light receiving face and is mounted with such face at a wall of said cavity which extends longitudinally of said rod and with such face facing transversely of the length of said rod.

5. An instrument as set forth in claim 4, wherein said light transmitting means projects light centrally of said cavity and further comprising a second light responsive cell embedded in said tubular portion of said rod and having a light receiving face, said second cell being mounted with said face thereof at a portion of the wall of said cavity which is opposite from the side thereof at which said face of said first-mentioned cell is mounted.

6. An instrument as set forth in claim 4, wherein said light transmitting means extends to a point adjacent a sidewall of said cavity extending longitudinally of said rod and which is spaced from said light receiving face and said light transmitting means comprises a light reflector at said point and mounted to reflect light from said means across said cavity and onto said face.

7. An instrument as set forth in claim 1, wherein said tubular portion is closed by an end wall at said free end and said opening extends through said first-mentioned wall in a direction transverse to the length of said rod and to the portion of said cavity adjacent said end wall and said rod has an air vent extending from a surface thereof spaced from said free end and said end wall to a portion of said cavity spaced from said end wall and said opening, wherein said cell is embedded in said end wall and is mounted to receive light transmitted longitudinally of said rod across said cavity and wherein said light transmitting means transmits light longitudinally of said rod across said cavity and from a portion of the latter spaced from said cell to said cell.

* * * * *